June 17, 1930. J. T. McTARNAHAN 1,764,459
LIQUID FUEL BURNING APPARATUS
Filed July 22, 1926 2 Sheets-Sheet 1

INVENTOR.
JOHN T. McTARNAHAN
BY
ATTORNEY.

INVENTOR.
JOHN T. McTARNAHAN
BY
ATTORNEY.

Patented June 17, 1930

1,764,459

UNITED STATES PATENT OFFICE

JOHN T. McTARNAHAN, OF BOSTON, MASSACHUSETTS

LIQUID-FUEL-BURNING APPARATUS

Application filed July 22, 1926. Serial No. 124,239.

The invention to be hereinafter described relates to a burner for liquid fuel which is simple in construction, cheap to manufacture, easy to install, and efficient in operation.

The character of the invention may be best understood by reference to the following description of a good form thereof shown in the accompanying drawings, wherein.

Figure 4:
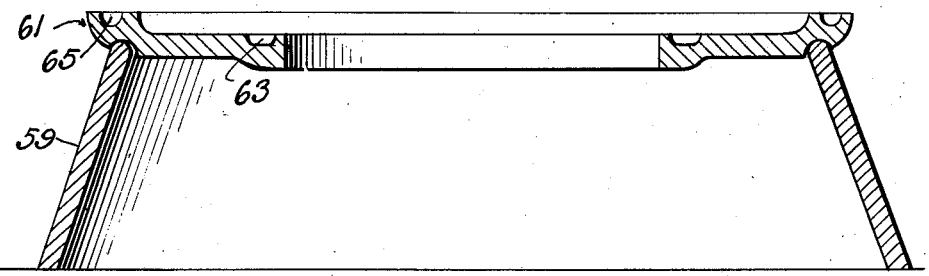
Fig. 4 is a sectional view of a modified form of base for the burner.
Figure 1:
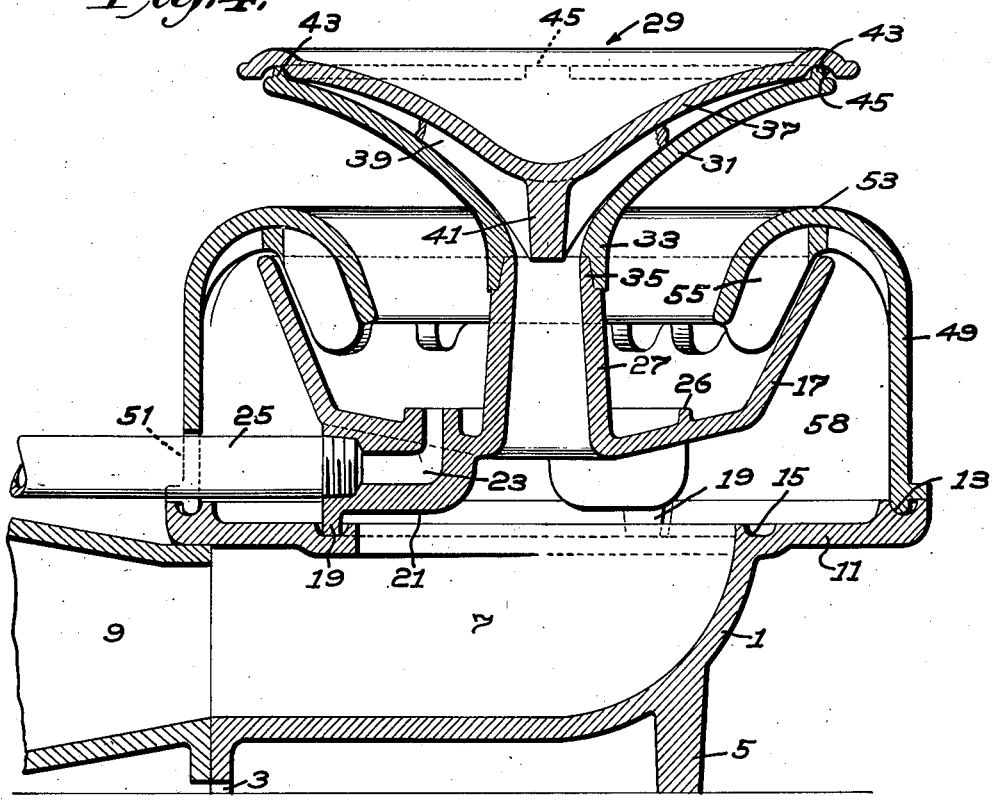
Fig. 1 is a vertical section through the burner.
Figure 2:
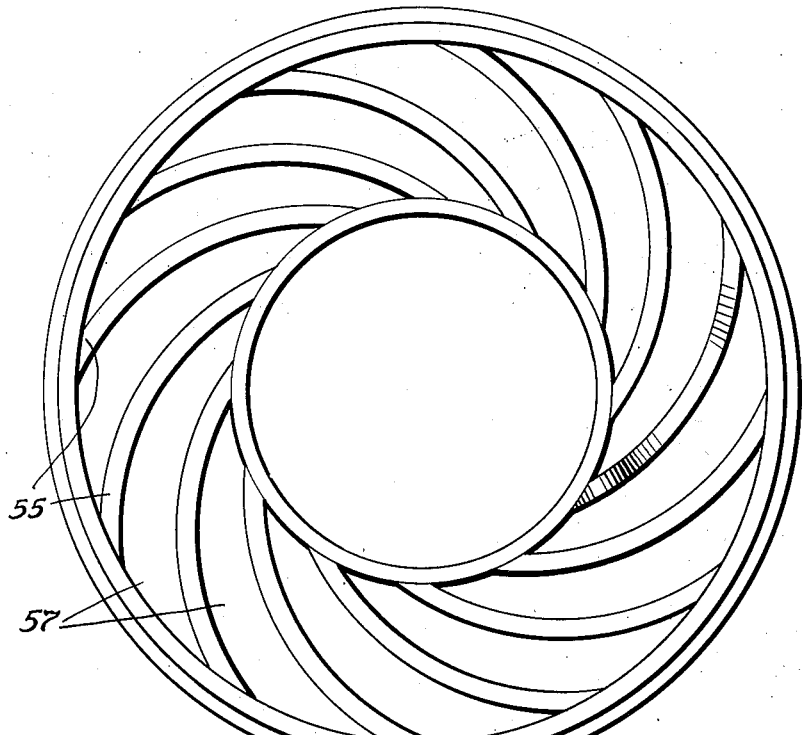
Fig. 2 is a view showing the disposition of the vanes in the arch of the hood.
Figure 3:
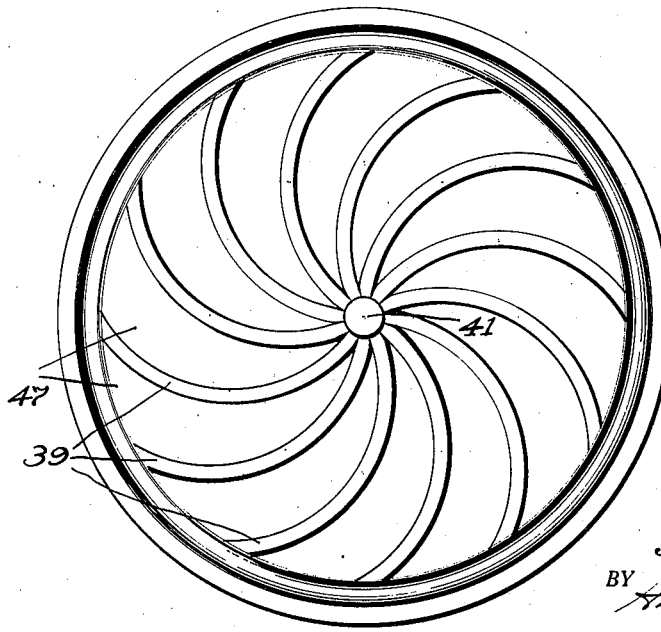
Fig. 3 is a view showing the disposition of the vanes in the mushroom-shaped deflector.

Referring to the drawings, the burner shown therein comprises a base 1 having a pair of feet 3 and a foot 5, said base being made hollow to provide a passage 7 adapted to receive air under pressure which may be conducted to the passage 7 through a fitting 9 secured to the base. Projecting outward at the top of the base is a ring-shaped flange 11 having circular grooves 13 and 15 formed therein.

The combustion chamber in the present instance is in the form of a bowl 17 having feet 19 resting in the groove 15. A lug 21 at the bottom of the bowl has a port 23 opening into the bowl, and said lug is tapped for connection with a pipe 25 for conducting the fuel to the bowl from a source of supply. A short circular lip 26 is formed upon the bottom of the bowl. Projecting up from the bottom of the bowl is a tubular support 27, and mounted on said support is a mushroom-shaped deflector 29 comprising a lower member 31 having a neck 33 counterbored to receive the reduced end 35 of the tube 27. An upper member 37 is downwardly dished and projecting from the under face of said member is a series of vanes or baffles 39 spirally disposed and radiating from a stud 41 projecting downward toward the tube 26, said vanes tapering outwardly toward the periphery of the upper member 37. The lower member 31 has four lugs 43 projecting up at the edge thereof and into a circular groove 45 in the under side of the upper member 37. The construction is such that passages or channels 47 are provided which are spirally disposed and communicate with the tube 27, and the latter in turn communicates with the passage 7 referred to, in the base.

A casing or hood 49 has its lower edge resting in the circular groove 13 referred to, in the base flange 11. The wall of the casing has an opening 51 through which the fuel conducting pipe 25 is entered. The hood has an annular arch 53 which projects over the rim of the bowl 17 and down into the bowl. Projecting down from the arch is a series of vanes or baffles 55 which are spirally disposed and have spiral passages or channels 57 between them for promoting a whirl of the air entering the bowl. The vanes 55 and the vanes 39 referred to, are preferably arranged so that they cause the air to whirl in opposite directions. The casing is spaced from the bowl to provide a passage 58 encircling the bowl and adapted to conduct the fluid from the passage 7 to the passages 57 between the vanes 55.

In operation, furnace oil or other liquid fuel may be conducted from a source of supply through the pipe 25 and the port 23 to the bottom of the bowl, and may flow over the lip in the bottom of the bowl. Air under pressure may be conducted by the passages 9 and 7 to the passage 58 in the casing surrounding the combustion chamber, and will pass thence through the spiral passages 57 in the arch and be directed downward with a whirling motion toward the bottom of the combustion chamber where it will meet the fuel. The air will also pass from the passage 7 up through the tube 27 and thence be directed outwardly through the spiral passages 47 in the mushroom-shaped deflector. The air will flow outward between the upper and lower members of the deflector, will meet the flame issuing from the combustion chamber and will have a whirling motion in a direction opposite to the whirling motion of the flame coming from the combustion chamber. As a result, the oppositely whirling primary and secondary air currents will mix and thoroughly atomize the liquid fuel and promote efficient combustion thereof.

The base, bowl, casing and the members of the mushroom deflector in the present instance are separate castings, and it will be noted that they are maintained in their assembled relation without the necessity of being secured together. As a consequence, they may be made cheaply and quickly and easily assembled. Also if it should be necessary to remove any of said parts for the purpose of inspection or cleaning, this may be quickly and easily accomplished.

The mushroom deflector 29 and the air passages therein serve several useful purposes. The flame rising from the hearth in the bowl is spread outward by the deflector. The air issuing through the passages is introduced to the flame so as to promote efficient combustion. The air distributed to and passing through the passages cools the deflector sufficiently to prevent it from being burnt. The air flowing through the passages is preheated prior to meeting the flame, and the spirally disposed vanes give the air a whirling motion causing it efficiently to cross and mix with the oppositely whirling flame coming from the combustion chamber.

The base for the burner described is designed more particularly for installations employing a forced blast of air. In some installations it may be desired to employ natural air draft, and to this end a base 59 (Fig. 4) may be substituted for the base described above. This base 59 is in the form of a tapered shell, and mounted thereon is a ring 61 having a circular groove on the under side thereof resting upon the rim of the shell. Grooves 63 and 65 are provided at the top of the ring and are adapted respectively to receive the feet of the bowl and the lower edge of the casing. This base is adapted to rest upon the grate of a furnace, and the air may flow up between the grate bars and through the shell to the passage 58 leading to the combustion chamber and through the tube leading to the passages in the mushroom deflector.

It will be understood that the invention is not limited to the specific embodiment shown, and that various deviations may be made therefrom without departing from the spirit and scope of the appended claims.

What is claimed is:—

1. A burner comprising, in combination, a bowl having a tube rising therefrom, means for conducting liquid fuel to the bowl, a deflector mounted on the tube provided with channels communicating with the tube, a casing having an annular arch projecting over the rim of the bowl and provided with channels, and means to conduct air to said tube and channels.

2. A burner comprising, in combination, a base, a combustion chamber mounted on the base, a casing mounted on the base having an arched portion projecting over a portion of the combustion chamber, a support projecting up in the combustion chamber, and a deflector mounted on said support, the arched portion of said casing being adapted to direct air down into the combustion chamber, and said support and deflector having channels for conducting air to the path of the flame leaving the combustion chamber.

3. A burner comprising, in combination, a combustion chamber, means to conduct liquid fuel to said chamber, means to conduct air to said combustion chamber and impart a whirling motion thereto, a tubular support projecting up from the combustion chamber, and a mushroom-shaped deflector on said support comprising upper and lower members, one of said members having a series of vanes projecting therefrom for causing whirling of air passing up through said support and between the upper and lower members.

4. A burner comprising in combination, a base, a bowl thereon having a combustion chamber therein, means to conduct liquid fuel to the combustion chamber, a casing receiving the bowl and spaced therefrom to provide an air conducting passage between the bowl and casing, means to conduct air to the passage, said casing having a portion projecting over the rim of the bowl and provided with a series of baffles for directing the air from the passage into the combustion chamber, a deflector above the bowl having a series of baffles, and means to direct the air to said baffles, said casing baffles and said deflector baffles being oppositely inclined.

5. A burner comprising in combination, a combustion chamber, means to conduct liquid fuel to the combustion chamber, a casing receiving the combustion chamber and spaced therefrom to provide an air conducting passage, said casing having an annular arch projecting over the combustion chamber and provided with a series of spirally disposed channels for receiving the air from said passage and directing the air into the combustion chamber, a deflector above the combustion chamber having a series of spirally disposed channels, and means for directing air to the deflector channels, the casing channels and the deflector channels being disposed in opposite spiral directions.

JOHN T. McTARNAHAN.